United States Patent
George et al.

(10) Patent No.: US 6,423,436 B1
(45) Date of Patent: Jul. 23, 2002

(54) TUBULAR ELECTROCHEMICAL DEVICES WITH LATERAL FUEL APERATURES FOR INCREASING ACTIVE SURFACE AREA

(75) Inventors: Thomas J. George, Star City, WV (US); G. B. Kirby Meacham, 18560 Parkland Dr., Shaker Heights, OH (US) 44122

(73) Assignees: The United States of America as represented by the United States Department of Energy, Washington, DC (US); G. B. Kirby Meacham, Shaker Heights, OH (US)

( * ) Notice: Subject to any disclaimer, the term of this patent is extended or adjusted under 35 U.S.C. 154(b) by 0 days.

(21) Appl. No.: 09/537,486

(22) Filed: Mar. 30, 2000

(51) Int. Cl.$^7$ ................................. H01M 8/12
(52) U.S. Cl. .............................. 429/31; 429/32; 429/39
(58) Field of Search ............................. 429/31, 32, 38, 429/39

(56) References Cited

U.S. PATENT DOCUMENTS

| | | | |
|---|---|---|---|
| 4,699,852 A | * 10/1987 | Yokoyama et al. | ........... 429/31 |
| 4,774,163 A | * 9/1988 | Sterzel | ...................... 429/31 X |
| 4,791,035 A | * 12/1988 | Reichner | ..................... 429/31 |
| 5,252,409 A | * 10/1993 | Akagi | ......................... 429/32 |
| 5,273,838 A | * 12/1993 | Draper et al. | ................. 429/31 |

\* cited by examiner

Primary Examiner—Stephen Kalafut
(74) Attorney, Agent, or Firm—George W. Moxon, II; Brouse McDowell (57) ABSTRACT

An electrochemical device is designed to conduct a process gas both horizontally and vertically through the electrochemical device, such that problems resulting from maldistribution of the process gas are substantially eliminated. The structure of the electrochemical device includes a stacked assembly of planar sheets of parallel, integrally connected tubes, wherein the tubes conduct a first process gas horizontally throughout the electrochemical device, passages defined between adjacent stacked sheets conduct a second process gas horizontally throughout the electrochemical device, and novel apertures formed at the connection between adjacent tubes within the sheets conduct the second process gas vertically throughout the electrochemical device.

10 Claims, 6 Drawing Sheets

TUBULAR ELECTROCHEMICAL DEVICES WITH LATERAL FUEL APERATURES FOR INCREASING ACTIVE SURFACE AREA

CONTRACTUAL ORIGIN OF THE INVENTION

The United States Government has rights in this invention pursuant to the employer-employee relationship of between the U.S. Department of Energy and the inventors.

TECHNICAL FIELD

This invention relates generally to electrochemical devices and is particularly directed to improvements in the process gas distribution and available active surface area in a solid state fuel cell.

BACKGROUND OF INVENTION

Fuel cells are electrochemical systems that generate electrical current by chemically reacting a fuel gas and an oxidant gas on the surface of electrodes. Conventionally, the components of a single fuel cell include the anode, the cathode, the electrolyte, and the interconnect material. In a solid state fuel cell, such as solid oxide fuel cells (SOFCs), the electrolyte is in a solid form and insulates the cathode and anode one from the other with respect to electron flow, while permitting oxygen ions to flow from the cathode to the anode, and the interconnect material electronically connects the anode of one cell with the cathode of an adjacent cell, in series, to generate a useful voltage from an assembled fuel cell stack. The SOFC process gases, which include natural or synthetic fuel gas (i.e., those containing hydrogen, carbon monoxide or methane) and an oxidant (i.e., oxygen or air), react on the active electrode surfaces of the cell to produce electrical energy, water vapor and heat.

Several configurations for solid state fuel cells (i.e., fuel cells having a solid electrolyte) have been developed, including the tubular, flat plate, and monolithic designs. In a tubular design, each single fuel cell includes electrode and electrolyte layers applied to the periphery of a porous support tube. While the inner cathode layer completely surrounds the interior of the support tube, the solid electrolyte and outer anode layers are discontinuous to provide a space for the electrical interconnection of the single fuel cell to the exterior surface of adjacent, parallel cells. Fuel gas is directed over the exterior of the tubular cells, and oxidant gas is directed through the interior of the tubular cells.

The flat plate design incorporates the use of electrolyte sheets which are coated on opposite sides with layers of anode and cathode material. Ribbed distributors may also be provided on the opposite sides of the coated electrolyte sheet to form flow channels for the reactant gases. A conventional cross flow pattern is constructed when the flow channels on the anode side of the electrolyte are perpendicular to those on the cathode side. Cross flow patterns, as opposed to co-flow patterns where the flow channels for the fuel gas and oxidant gas are parallel, allow for simpler, more conventional manifolds to be incorporated into the fuel cell structure. A manifold system delivers the reactant gases to the assembled fuel cell. The coated electrolyte sheets and distributors of the flat plate design are tightly stacked between current conducting bipolar plates. In an alternate flat plate design, uncoated electrolyte sheets are stacked between porous plates of anode, cathode, and interconnecting material, with gas delivery tubes extending through the structure.

The monolithic solid oxide fuel cell (MSOFC) design is characterized by a honeycomb construction that is fused together into a continuous structure. The MSOFC is constructed by tape casting or calendar rolling the sheet components of the cell, which include thin composites of anode-electrolyte-cathode (A/E/C) material and anode-interconnect-cathode (A/I/C) material. The sheet components are corrugated to form co-flow channels, wherein the fluid gas flows through channels formed by the anode layers, and the oxidant gas flows through parallel channels formed by the cathode layers. The monolithic structure, comprising many single cell layers, is assembled in a green or unfired state and co-sintered to fuse the materials into a rigid, dimensionally stable SOFC core.

These conventional designs have been improved upon in the prior art to achieve higher power densities. Power density is increased by incorporating smaller single unit cell heights and shorter cell-to-cell electronic conduction paths. SOFC designs have thus incorporated thin components which are fused together to form a continuous, bonded structure. However, the large number of small components, layers, and interconnections, in addition to complex fabrication steps, decreases the reliability of operational fuel cells. In addition, any given fuel cell design must be commercially viable as an alternative power generating device, and, therefore, factors affecting the economics of power generation by electrochemical activity, such as overall capital and operational costs to the user, must be comparable to those of conventional power generating systems.

The present invention is directed to improving the process gas distribution and available active surface area in a solid state fuel cell having a unique planar tube-sheet design. Accordingly, the fuel cell stack is constructed from individual planar sheets of integrally connected, parallel tubes. The fuel cell stack is assembled by stacking the individual planar tube-sheets, such that the tubes within each sheet conduct a first process gas horizontally through the fuel cell stack, and spaces formed between adjacent stacked sheets define gas flow passages for conducting a second process gas horizontally through the fuel cell stack. With respect to each individual sheet, a series of perforations are formed in the sheet material between and connecting adjacent tubes. The perforations, referred to herein as "lateral fuel apertures" due to their disposition on the sheet material extending to the side of each tube, importantly conduct the second process gas vertically through the fuel cell stack.

Advantageously, the lateral fuel apertures result in significantly improved fuel distribution within the fuel cell stack, such that the occurrence of harmful hot spots is substantially reduced. The lateral fuel apertures also provide a greater active cathode-electrolyte-anode surface area within the fuel cell stack for achieving higher power densities, as well as anode-electrolyte continuity about the circumference (from the top to the bottom) of each tube, representing a low cost method for maximizing fuel cell active surface area. This solid state fuel cell design is a viable technology for future commercial installations.

Therefore, an object of the present invention is to provide a solid state fuel cell design incorporating unique lateral fuel apertures that improves fuel distribution and substantially eliminates the formation of hot spots within the fuel cell assembly.

Another object of the present invention is to provide a solid state fuel cell design incorporating unique lateral fuel apertures that increase the active surface area per unit fuel cell, such that the overall power density of the assembled fuel cell stack is critically improved.

Another object of the present invention is to simplify the construction of an assembled fuel cell system by forming and stacking planar sheets of integrally connected tubes, preferably manufactured by a single extrusion step.

Yet another object of the present invention is to increase current flow within the fuel cell system by graduating the thicknesses of the electrode structures of the planar sheets of integrally connected tubes, according to the direction of the current flow through the fuel cell stack.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentation and combinations particularly pointed out in the appended claims.

BRIEF SUMMARY OF THE INVENTION

Briefly, this invention is a solid state electrochemical device that incorporates lateral fuel apertures into a monolithic fuel cell assembly constructed from stacking planar sheets of integrally connected, parallel tubes. The design significantly improves fuel distribution within the fuel cell assembly and increases the available active surface area per unit fuel cell to achieve greater power densities.

Individual planar sheets are composed of a series of parallel, longitudinally aligned tubes that are integrally connected along their lengths to define the sheet. Importantly, adjacent tubes within the sheet are spaced a desired distance apart and connected one to the other by continuous, laterally extending sheet material. The individual planar sheets of integrally connected tubes are preferably fabricated from cathode material and easily and economically manufactured by a single extrusion step. The tubes have open ends for receiving and discharging an electrochemical process gas. A layer of electrolyte material is applied to the external surfaces of the cathode body (interconnect strip excepted, as explained below), and the electrolyte surface is then coated by an anode material, resulting in an active cathode-electrolyte-anode composite surface. The top surface layers of electrolyte and anode material are interrupted by interconnect strips that are applied to the top surface of the planar sheets, along the length of each tube.

The solid state electrochemical device is assembled by uniformly stacking the individual planar sheets (all tubes are parallel), such that points of contact between adjacent sheets is limited to the interconnect strip of a lower sheet contacting and supporting the anode layer of an upper sheet. In operation, the tubes define oxidant gas flow passages extending horizontally through the assembled fuel cell stack. Longitudinal passages formed between adjacent, stacked planar sheets define fuel gas flow passages extending horizontally through the assembled fuel cell stack.

A critical feature of the invention are lateral fuel apertures passing through the connecting material between adjacent tubes within each planar sheet. The lateral fuel apertures are preferably a row of perforations configured to conduct fuel gas vertically through the stacked array of planar sheets, improving the uniformity of fuel distribution throughout the assembly, such that damaging hot spots caused by uneven or mal-distribution of the fuel is avoided. The lateral fuel apertures connect a lower horizontal gas flow passage formed between adjacent sheets with an upper horizontal gas flow passage formed between adjacent sheets. The lateral fuel apertures may be staggered on either side of a tube to effectively manage mechanical stress within the structure of the fuel cell stack. In addition, the interior cathode surfaces of the lateral fuel apertures are coated with electrolyte and anode layers, to provide for additional cathode-electrolyte-anode active surfaces within the fuel cell stack.

Another feature of the invention is the variation of the thicknesses of the cathode body and the anode layers about the circumference of the tubes within the planar sheets, according to the direction of current flow downwardly through the fuel cell stack. Varying the thickness of the electrode materials reduces resistance of the current path.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE INVENTION

The present invention relates to a solid state electrochemical device that provides increased active surface area and improves even distribution of a process gas. The present invention is described with respect to a detailed description of its application in the operation of a solid state fuel cell having a solid oxide electrolyte: a solid oxide fuel cell (SOFC). However, it will be obvious to those skilled in the art from the following detailed description that the invention is likewise applicable to any electrochemical system, including electrolysis cells, heat exchangers, chemical exchange apparatuses, and oxygen generators, among other applications.

Figure 1:
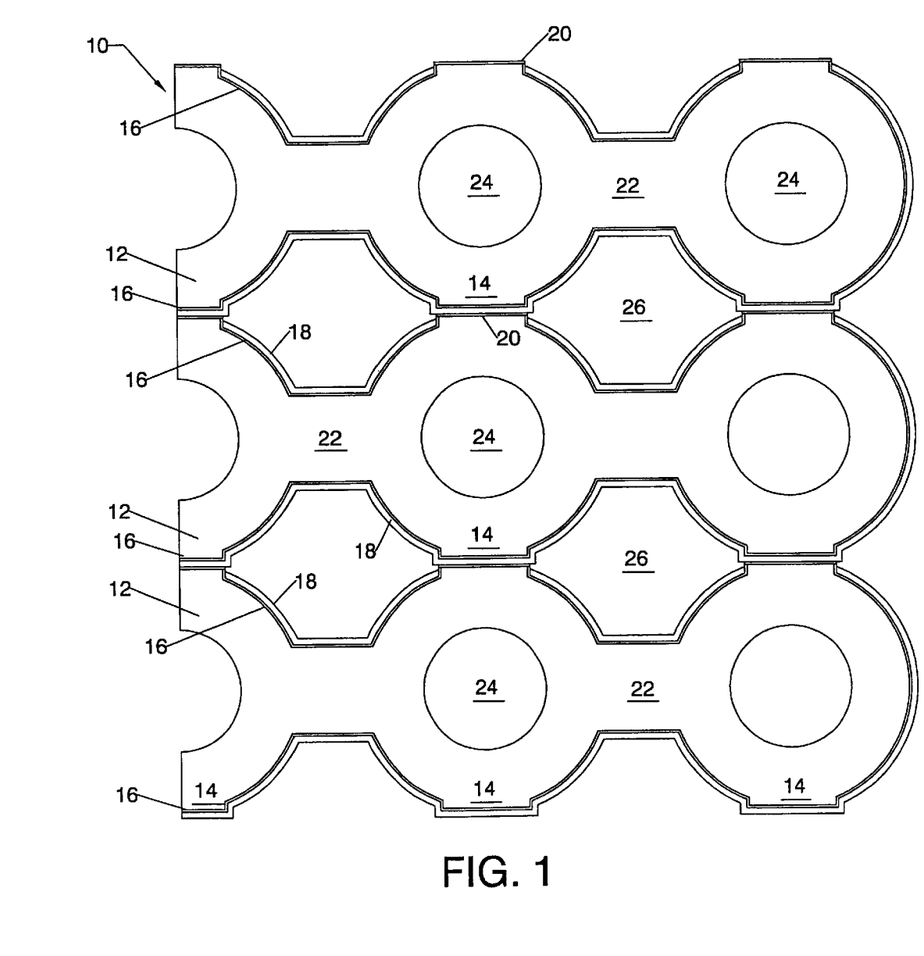
FIG. 1 is an illustration of an assembled fuel cell stack constructed from planar sheets of integrally connected tubes.

FIG. 1 shows a cross-sectional view of three individual planar sheets 12 of integrally connected tubes 14 assembled by stacking the sheets 12 to form a monolithic fuel cell assembly 10. Each planar sheet 12 is constructed from generic fuel cell components, e.g., cathode, anode, electrolyte, and interconnect materials, and preferably, the planar sheets 12, including the tubes 14, are constructed from cathode material by a single extrusion step. A layer of electrolyte 16 is applied to the top and bottom exterior surfaces of the planar sheet 12, and a layer of anode material 18 is applied over the electrolyte layers 16, to form active cathode-electrolyte-anode composite surfaces for promoting electrochemical reactions.

An interconnect strip 20 is applied to the top, exterior surface and along the length of each tube 14. (Alternatively, the interconnect strip may be applied to the top and/or bottom of each of tube.) The interconnect strips 20 directly connect the electrolyte coated cathode 14 of a lower sheet with the bottom layer of anode material 18 of an adjacent upper sheet. The interconnect strip 20 is in contact with the cathode material 14 of the tube 12 to which it is applied, while being electrically isolated from the anode layer 18 of the same sheet 12. The point of contact between the cathode and interconnect materials is an electrical bond between adjacent planar sheets 12.

The planar sheets 12 are uniquely designed, combining certain aspects of the individual tube approach and the planar or flat plate construction known in the art of electrochemical devices, as well as novel aspects. According to the present invention, each sheet 12 of integrally connected tubes 14 is substantially planar and includes within its construction parallel rows of longitudinally aligned tubes 14 that extend the length of the planar sheet 12. The tubes 14 have a first open end at a first edge of the sheet and a second open end at a second edge of the sheet that is opposite from the first edge of the sheet 12. (The ends of the tubes 14 and the edges of the sheets 12 are not shown by the cross-sectional perspective of FIG. 1). Importantly, each tube 14 is integrally connected along its length to an adjacent tube 14 within the same sheet 12 by sheet material 22 extending laterally, or from at least one side of, the tubes 12. The tubes 14 and the laterally extending sheet material 22 are continuous and together form the planar sheets 12 of integrally connected tubes 14. The spacing between adjacent tubes, i.e., the width of the laterally extending sheet material 22, is sufficient for incorporating a critical feature of the invention: lateral fuel apertures (not shown), described in detail below.

The monolithic fuel cell system 10 is assembled by stacking individual sheets 12, such that all the tubes 14 are parallel. The tubes 14 define first gas flow passages 24 for conducting a first process gas (e.g., oxidant) horizontally through the fuel cell stack 10. Spaces formed between adjacent stacked sheets 12 define second gas passages 26 for conducting a second process gas (e.g., fuel, hydrogen) horizontally through the fuel cell stack 10.

Several methods for constructing the planar sheets of integrally connected tubes are contemplated, including extrusion of the first electrode material (i.e., cathode, anode), and application of the electrolyte and the second electrode material (i.e., anode, cathode) layers on the exterior or interior surfaces of the tubes. The extrusion of all of the fuel cell components (i.e., anode, cathode, electrolyte, interconnect) in a single extrusion step is foreseeable, with the advance of manufacturing technologies. Fabricating the tube sheets by extrusion advantageously results in a structurally stable monolith that may be fired, such that thin films of electrolyte, anode, and/or interconnect material coat the fired structure, and the application of thick layers of fuel cell materials is avoided. The tubes may further be constructed from two halves of the tubular structure, and subjected to pressing and assembly operations in a green state.

Generally, the preferred cross-sectional area of the gas flow passages is determined by pressure drop calculations across the fuel cell stack. The thickness of the cathode tubes 14 is at least 0.50 mm, with a preferred thickness in the range of between about 1.0 mm to about 1.5 mm. The thickness of the electrolyte layer 16 is preferably 125 microns. Specific planar sheet geometries are a function of the following fuel cell stack 10 characteristics: resistance to gas flow (pressure drop), resistance to current flow, limitations of manufacturing process, and structural and electrochemical considerations, among others.

Figure 2:
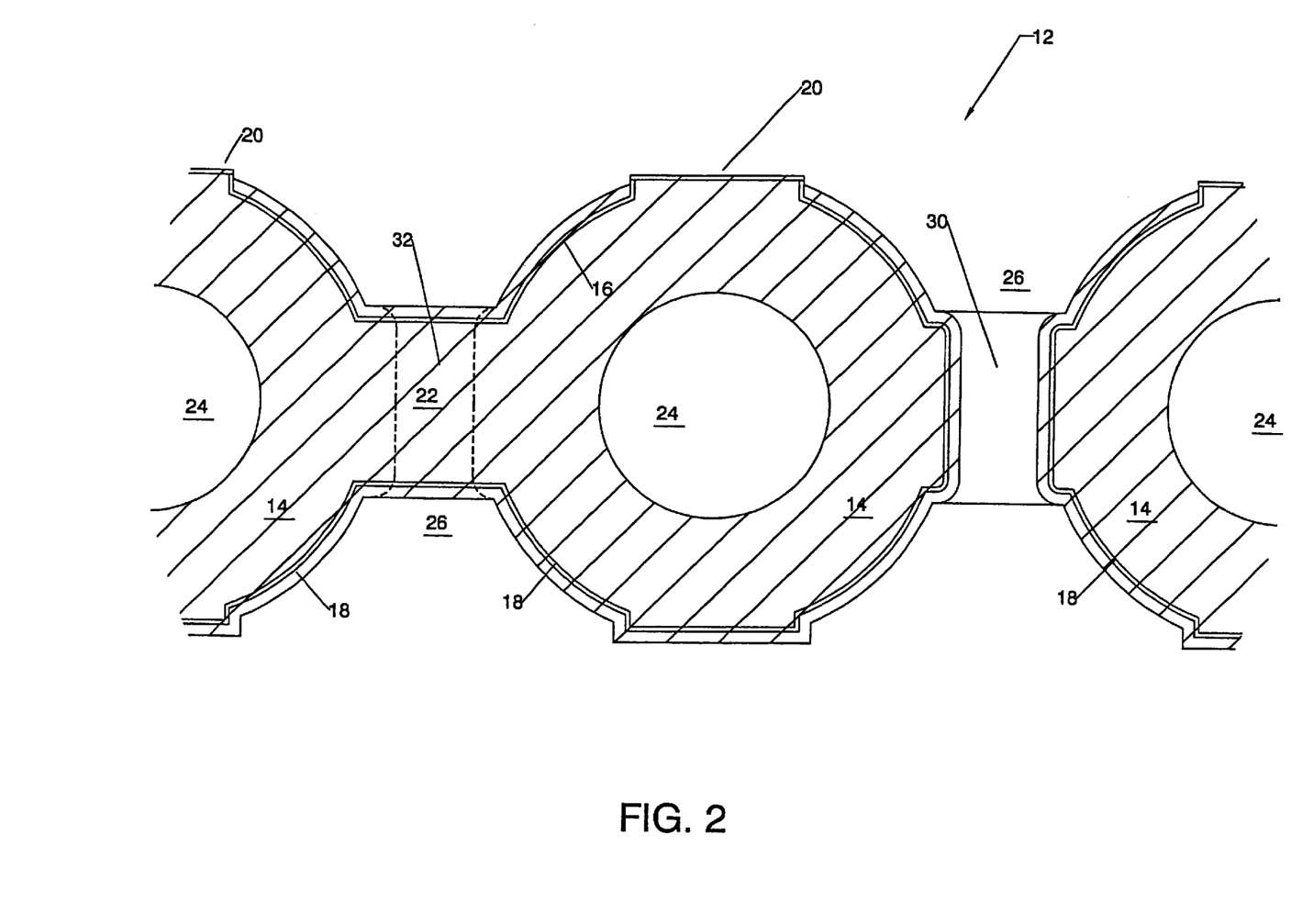
FIG. 2 is an illustration of a single planar sheet of integrally connected tubes, including lateral fuel apertures.

FIG. 2 shows a cross-sectional view of a single planar sheet 12 of integrally connected tubes 14, including lateral fuel apertures 30, 32. The connecting sheet material 22 that extends laterally between adjacent tubular cells 14 is perforated by a series of apertures 30, 32, referred to as lateral fuel apertures because the apertures pass through the connecting sheet material 22 that extends laterally from and connects the sides of adjacent tubular cells 14. The lateral fuel apertures 30, 32 pass through the entire thickness of the connecting sheet material 22 between adjacent tubes 14, such that fuel gas may flow vertically between stacked sheets within the fuel cell assembly, and more specifically, between upper and lower horizontal gas flow passages 26 defined between adjacent sheets. The lateral fuel apertures 30, 32 may be made by methods known in the art, such as by a punching or boring operation. The lateral fuel apertures 30, 32 are preferably staggered, i.e., arranged alternately on either side of a tube 14, to provide better distribution of mechanical stress throughout the fuel cell stack. The spacing or distance between individual lateral fuel apertures 30, 32 along the laterally extending sheet material 22 between adjacent tubes 14 may be uniform or non-uniform.

The vertical fuel gas flow provided for by the lateral fuel apertures allows for a more uniform fuel distribution throughout the fuel cell assembly and reduces the formation of hot spots during operation of the fuel cell stack. In addition to improving process gas distribution throughout the fuel cell stack, a primary advantage of incorporating lateral fuel apertures within the sheets of integrally connected tubes is to increase the active surface area (cathode-electrolyte-anode interface) of the fuel cell stack. This is accomplished by coating the interior surface of the lateral fuel aperture with electrolyte and anode material, such that a continuous anode-electrolyte composite layer connects the anode layer applied to the top surface of the tube with the anode layer applied to the bottom surface of the tube.

Figure 3:
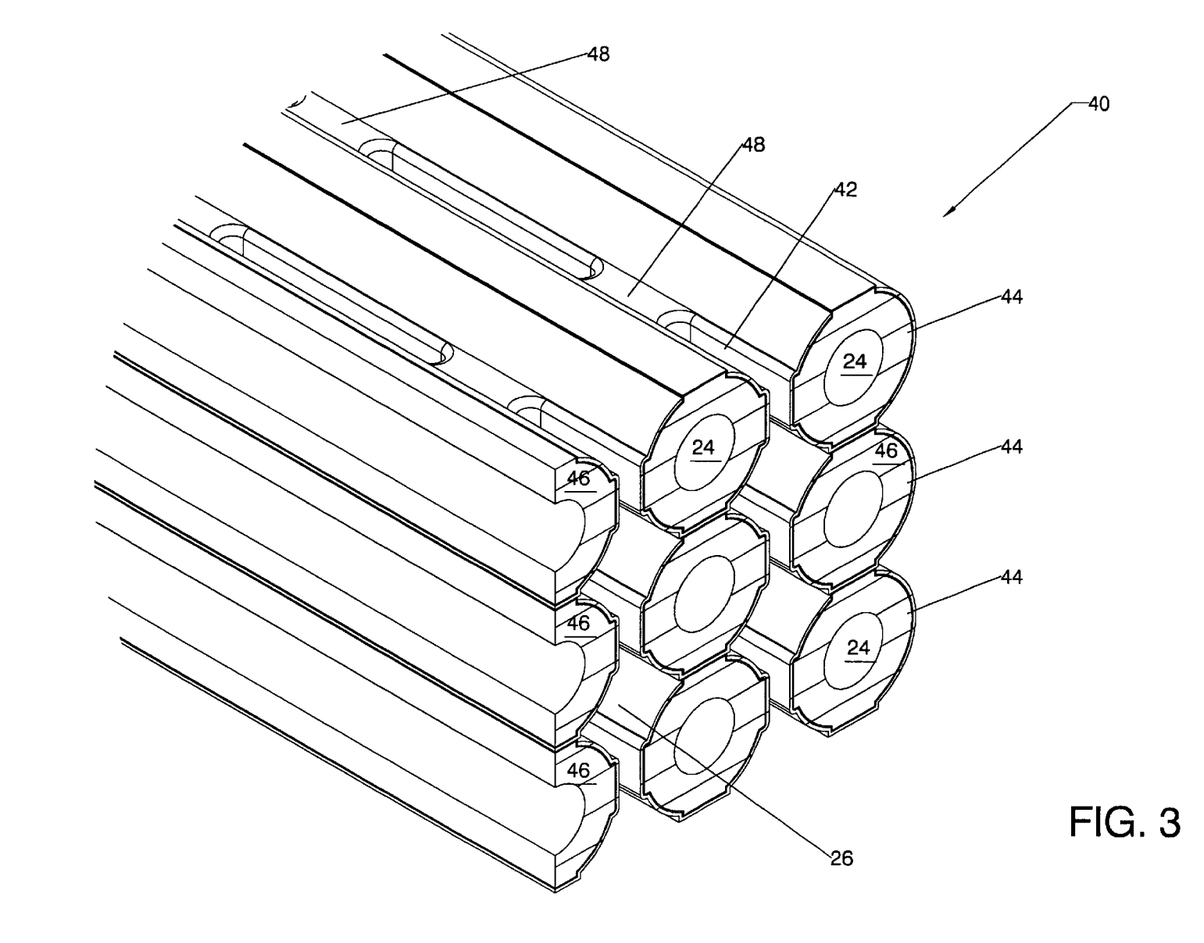
FIG. 3 is an illustration of an assembled fuel cell stack constructed from planar sheets of integrally connected tubes, including lateral fuel apertures.
Figure 4:
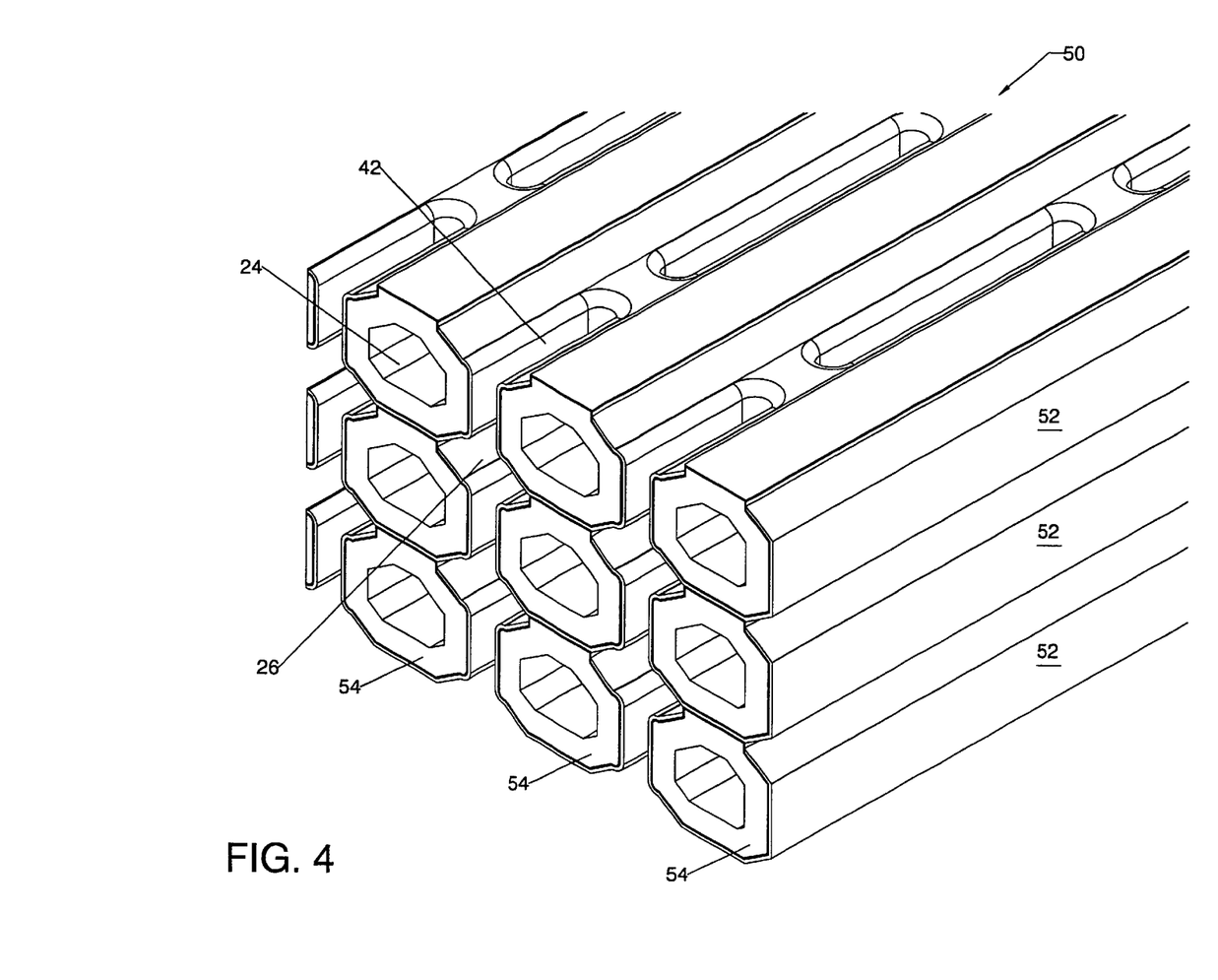
FIG. 4 is an illustration of an assembled fuel cell stack constructed from planar sheets of integrally connected tubes, including lateral fuel apertures and tubes having octagonal cross-sections.

FIG. 3 shows a three-dimensional view of a monolithic fuel cell stack 40 constructed from planar sheets 44 of integrally connected tubes 46, including lateral fuel apertures 42 along the connecting material 48 between adjacent tubes 46. According to the present invention, fuel is conducted horizontally though the fuel cell stack 40 by the fuel passages 26 defined between adjacent stacked sheets 44, and also vertically through the fuel cell stack 40 by the lateral fuel apertures 42. In addition to the circular cross-sections shown in FIG. 3, the tubes may also have alternative geometries for optimizing the active surface area within the fuel cell stack. For example, FIG. 4 shows a fuel cell stack 50 constructed by stacking planar sheets 52 of integrally connected tubes 54, including lateral fuel apertures 42, wherein the tubes 54 have octagonal cross-sections.

Figure 5:
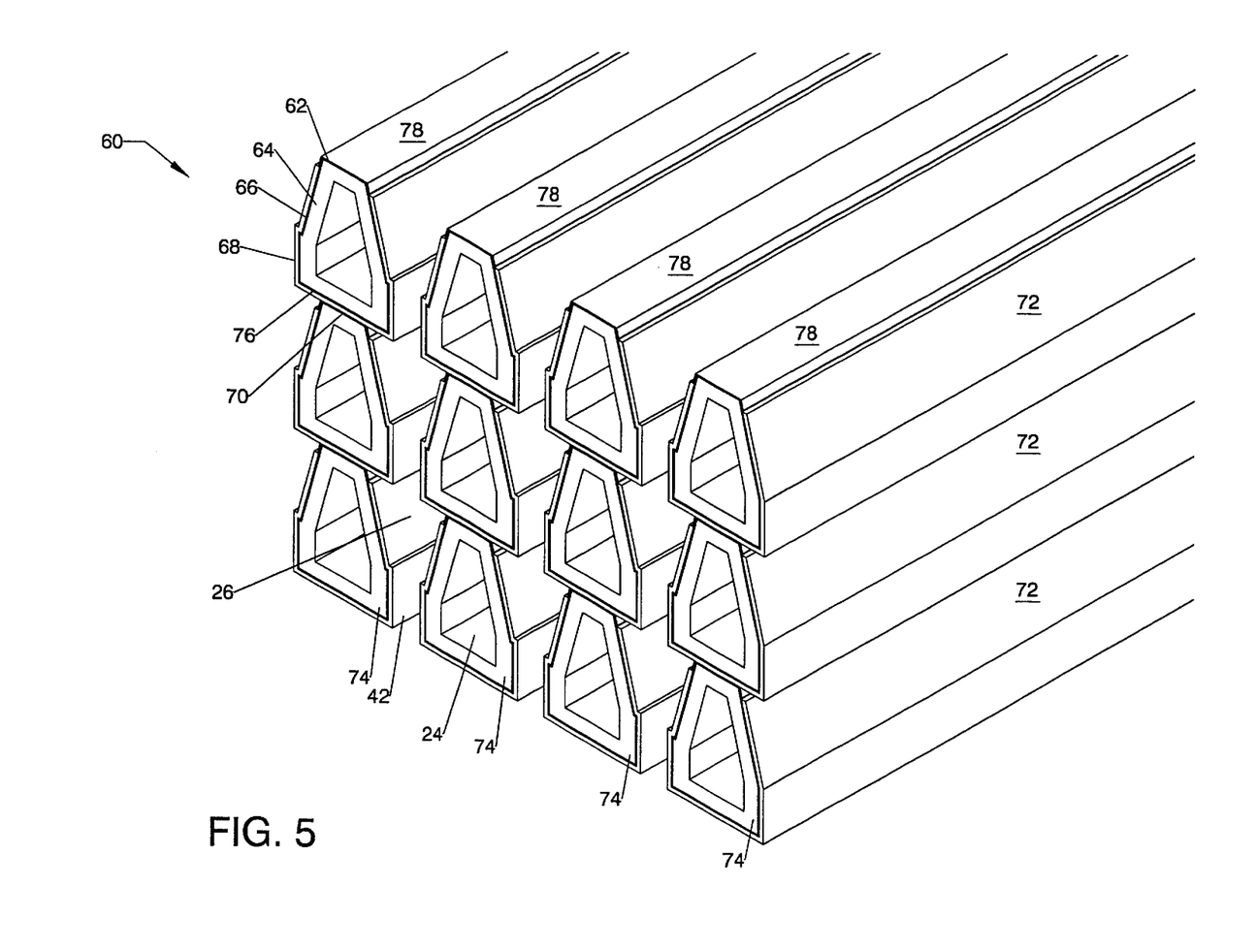
FIG. 5 is an illustration of an assembled fuel cell stack constructed from planar sheets of integrally connected tubes, including lateral fuel apertures and tubes having hexagonal cross-sections.

FIG. 5 shows a high density, or tightly packed, fuel cell assembly of stacked planar sheets 72 of integrally connected tubes 74 having hexagonal cross-sections. The fuel cell stack 60 includes horizontal air passages 24, horizontal fuel passages 26, and lateral fuel apertures 42 for conducting fuel gas vertically through the fuel cell stack 60. The sheets 72 are constructed from cathode material 64 and have electrolyte 66 and anode 68 coatings applied, in series, to a substantial portion of the exterior surface 76 of the cathode tubular body 74. An interconnect material 62 is applied to the top exterior surfaces 78 of the tubes 74, such that the anode layer 68 of a lower sheet is in contact by a sintered connection 70 with the interconnect material 62 of an adjacent upper sheet.

Another feature of the invention involves graduating the thicknesses of the anode and cathode components of the planar sheets according to the direction of the current flow through the tubular fuel cell. In the embodiments shown in FIGS. 1, 3, 4 and 5, electrons generated by the fuel cell chemical reactions flow between adjacent sheets from an upper sheet to a lower sheets, via the interconnect strip. Therefore, for each sheet, the anode layer becomes gradually thicker in the direction of current flow, such that the continuous anode layer (including the top anode layer, bottom anode layer, and connecting anode coated, lateral fuel aperture anode layer) is at a minimum thickness at the top of the tubes and nearest the interconnect strip. The anode layer becomes gradually thicker along the circumference of the tubes and is at a maximum thickness at the base and along the bottom surface of the tubes. Conversely, the cathode material comprising the tubes within a sheet becomes gradually thinner in the direction of current flow through the sheet, such that the cathode material is at a maximum thickness at the top of the tubes and nearest the interconnect strip, and becomes gradually thinner at about the sides of the tubes and is at a minimum thickness at the base of the tubes and along the bottom surface of the tubes. Such variation reduces resistance losses as current flows through the fuel cell system.

Figure 6:
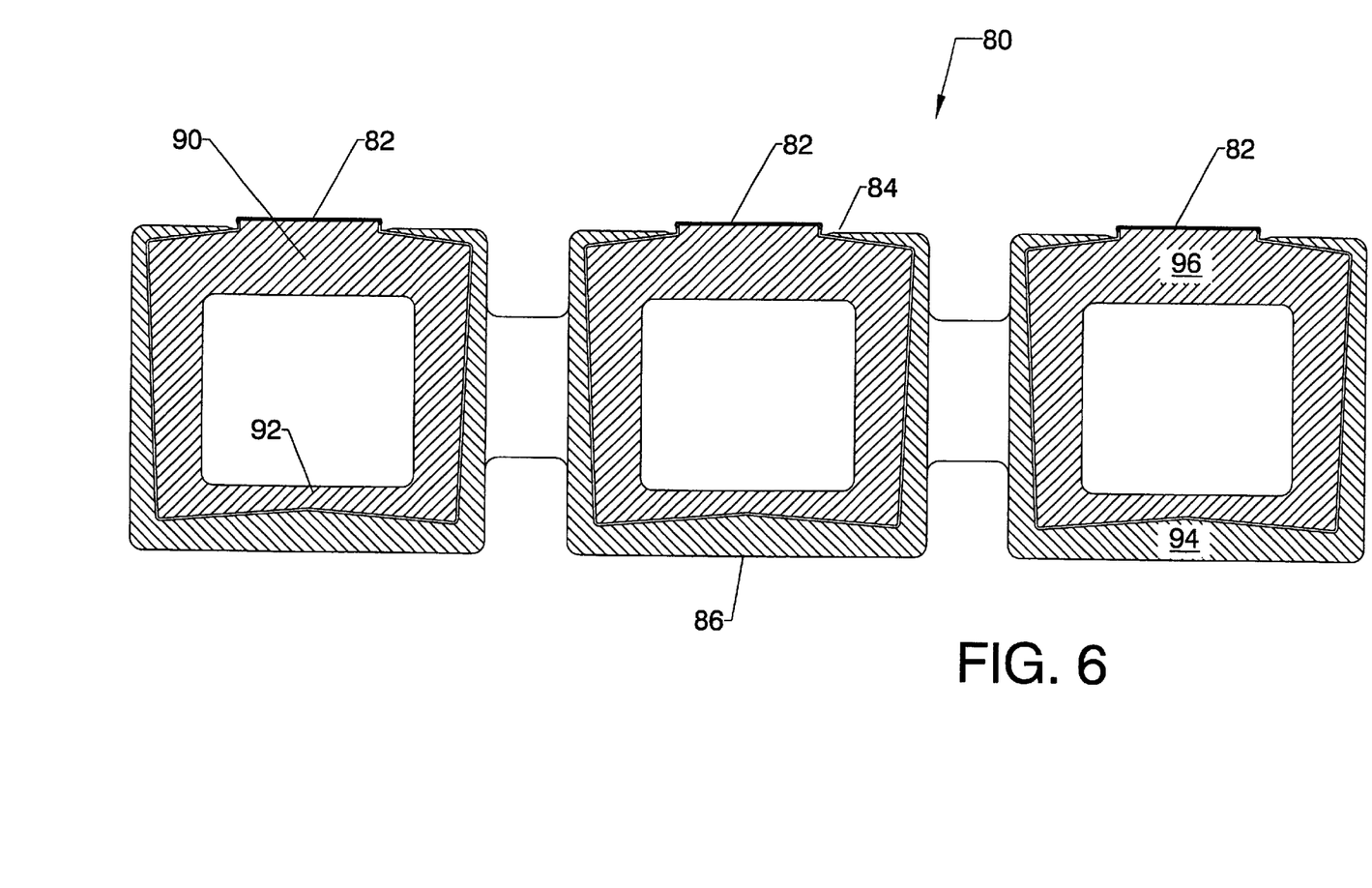
FIG. 6 is an illustration of a single planar sheet of integrally connected tubes, including lateral fuel apertures and graduated electrode thicknesses.

FIG. 6 illustrates the graduated thickness of the anode and cathode components. The anode layer 94 becomes gradually thicker in the direction of current flow, such that the thickness of the anode layer applied to the top surface of the planar sheet 80 is at a minimum at the point of closest proximity 84 to the interconnect material 82, and the thickness of the anode layer gradually increases and is at a maximum at the farthest point 86 from the interconnect material 82. Conversely, the thickness of the cathode material 96 comprising the tubes is at a maximum at the point of closest proximity 90 to the interconnect material 82 and gradually decreases and is at a minimum at the farthest point 92 from the interconnect material 82. As is similar to FIGS. 1–5, between anode layer 94 and cathode layer 96 is electrolyte layer 88.

It is appreciated by those skilled in the art of solid state electrochemical devices that the above described design may be useful in fuel cells, electrolysis cells, heat exchangers, chemical exchange apparatuses, and oxygen generators, among other applications.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A solid state electrochemical device, comprising:
   a plurality of first horizontal gas flow passages traversing the electrochemical device for conducting a first process gas through the electrochemical device;
   a plurality of vertical gas flow passages for conducting the first process gas, wherein said horizontal gas flow passages and said vertical gas flow passages are oriented in directions which are mutually perpendicular and wherein each vertical gas flow passage in communication with and between said first horizontal gas flow passages, such that the process gas is uniformly distributed throughout the electrochemical device.

2. An electrochemical device recited in claim 1, further comprising:
   a plurality of second horizontal gas flow passages for conducting a second process gas through the solid state fuel cell, wherein the second horizontal gas flow passages are not in communication with said plurality of first horizontal gas flow passages or said plurality of vertical gas flow passages.

3. An electrochemical device recited in claim 2, further comprising:
   a series of parallel tubes having open ends and being aligned in a substantially horizontal plane, wherein adjacent tubes are longitudinally connected to form a sheet, and wherein said tubes are said second horizontal gas flow passages;
   a stack of said sheets, wherein all tubes are substantial parallel and said first horizontal gas flow passages are defined between adjacent sheets; and
   at least one aperture in said connection between adjacent tubes within one of said sheets, wherein said apertures are said vertical gas flow passages.

4. An electrochemical device recited in claim 3, further comprising:
   cathode material comprising said tubes and said connection between adjacent tubes;
   an electrolyte layer applied to any exterior surface of said tubes, including any exterior surface within said aperture;
   an anode layer applied over said electrolyte layer; and
   an interconnect strip applied to each longitudinal surface of any tube comprising a lower sheet that is in contact with an upper sheet within said stack, wherein said interconnect strip is in contact with said cathode material of said tube to which said interconnect strip is applied and isolated from any electrolyte and anode layers thereon.

5. An electrochemical device recited in claim 3, wherein said tubes have a cross-section with a geometry selected from the group consisting circular, octagonal, and hexagonal.

6. An electrochemical device recited in claim 4, wherein any anode layer increases in thickness in the direction of current flow through the stack, and any cathode material decreases in thickness in the direction of current flow through the stack.

7. A solid state fuel cell assembly, comprising
   a substantially horizontal and planar sheet comprised of a cathode material and having a first edge, an opposing second edge, and an exterior surface;
   a plurality of parallel, linear oxidant gas passages formed within said sheet, wherein each oxidant gas passage is longitudinally connected to an adjacent oxidant gas passage, and wherein each oxidant gas passage having a first open end at the first edge of said sheet and a second open end at the second edge of said sheet;
   lateral fuel apertures disposed along the connection between adjacent oxidant gas passages allowing fuel to travel/traverse in a direction that is perpendicular to the orientation of said linear oxidant gas passages;

an electrolyte coating applied to the exterior surfaces of said sheet;

an anode coating applied to cover said electrolyte coating;

a plurality of interconnect strips applied to the top surface of said sheet, said interconnect strips having a first end at the first edge of said sheet and a second end at the second edge of said sheet, said interconnect strips being positioned above said oxidant gas passages within said sheet, wherein said interconnect strips are in contact with said cathode material and electronically isolated from said electrolyte and anode coatings;

a plurality of said sheets stacked together, such that said oxidant gas passages of adjacent sheets are parallel, and the interconnect strip of a lower sheet is in contact with the anode coating of an adjacent upper sheet, forming an electrical bond therebetween; and fuel gas passages formed between adjacent sheets, wherein said lateral fuel apertures conduct fuel gas vertically between said fuel gas passages within the solid oxide fuel cell assembly.

8. A solid oxide fuel cell assembly recited in claim 7, wherein said plurality of oxidant gas passages have cross-sections selected from geometries consisting of circles, octagons, and hexagonal.

9. A solid oxide fuel cell assembly recited in claim 7, wherein current flows from an upper sheet to an adjacent lower sheet via the interconnect strip, and said anode coating increases in thickness in the direction of current flow through the solid state fuel cell assembly.

10. A solid oxide fuel cell assembly recited in claim 7, wherein current flows from an upper sheet to an adjacent lower sheet via the interconnect strip, and said cathode material decreases in thickness in the direction of current flow through the solid state fuel cell assembly.

* * * * *